Jan. 20, 1948.   B. SZCZENIOWSKI   2,434,678
SUPERCHARGER
Filed May 30, 1944
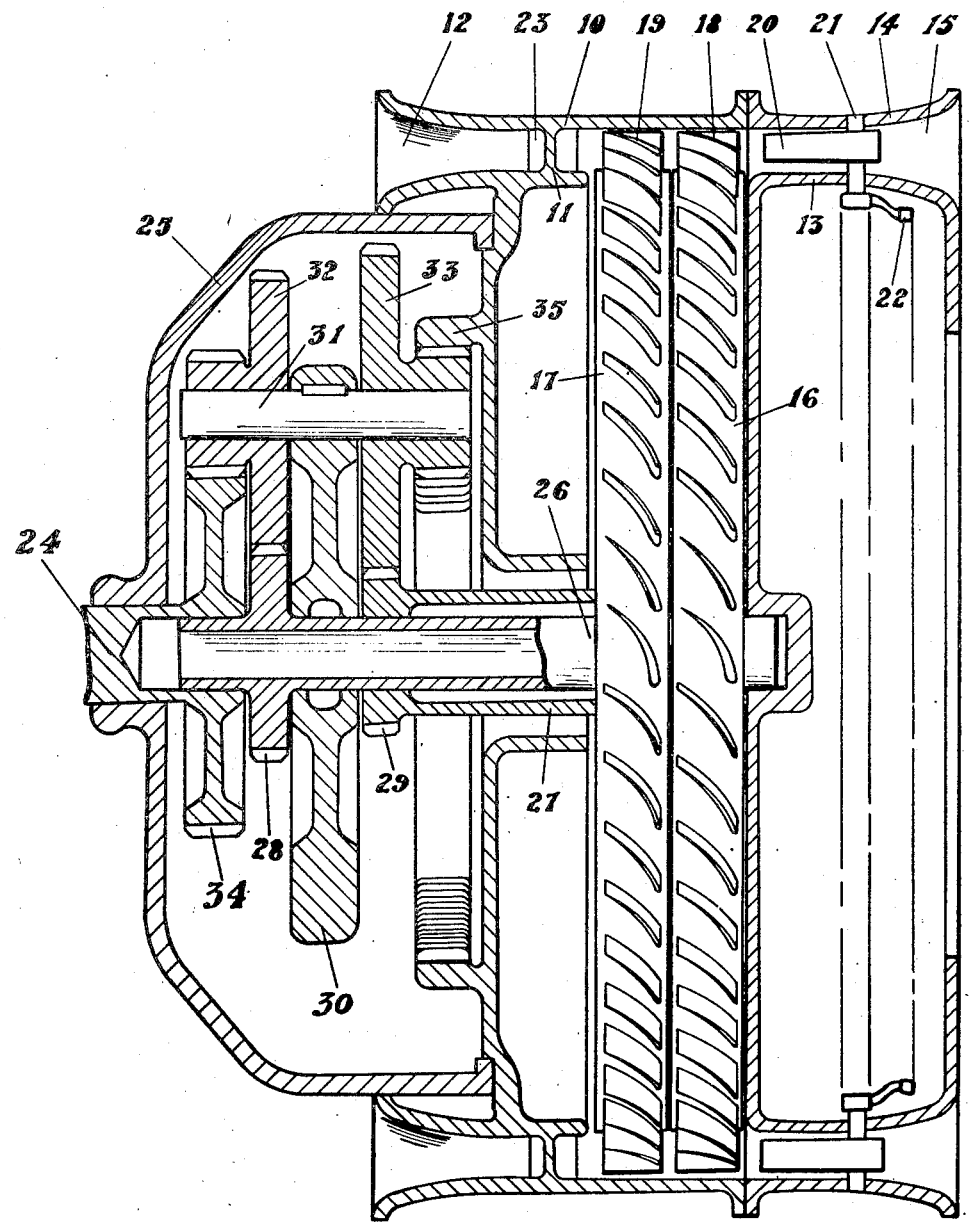
INVENTOR
BOLESLAW SZCZENIOWSKI
BY
ATTORNEY Patented Jan. 20, 1948

2,434,678

UNITED STATES PATENT OFFICE 2,434,678

SUPERCHARGER

Boleslaw Szczeniowski, Montreal, Quebec,
Canada

Application May 30, 1944, Serial No. 538,081
In Canada June 5, 1943

3 Claims. (Cl. 230—122)

My invention relates to improvements in superchargers, particularly for use in compressing air or the air-fuel mixture for aircraft engines, of the type in which compression is effected by imparting a high velocity to the gas particles by blades on a rotating impeller.

An object of my invention is to devise a supercharger which will have a substantially constant efficiency over a range of variation in the density and/or the quantity of air or other fluid compressed by the device. It is well known that a rotary compressor may be designed to operate at high efficiency, i. e., give a desirable compression ratio of fluid with a minimum of power input, for any particular set of specified operating conditions, particularly as regards the density of the fluid being compressed, but a compressor which has a high efficiency when compressing fluid of one density may have an altogether different efficiency when pumping fluid of a different density at the inlet, the outlet pressure being constant, and when the device is being used to compress the air charge for an aircraft engine this may result in a most undesirable condition in that the desired compression ratio is obtained at only one altitude, which corresponds to the compression ratio at which the compressor operates most efficiently, whereas at any other altitude and correspondingly different density of air, the efficiency of the compressor falls off markedly with consequent loss in efficiency and power of the aircraft engine, because a part of the compression ratio obtained in the supercharger must be destroyed by the throttling.

A further object is to devise such a compressor in which the impeller means operates at a high aerodynamic efficiency over a wide range of conditions, i. e., it has means for varying the volumetric output and compression ratio at such a high efficiency, in accordance with a wide range of air densities and altitudes.

A last object is to devise such a compressor in which the efficiency is as high as in the orthodox axial one, without lowering the high compression ratio which usually appears in a radial compressor.

With the above and other objects, which will hereinafter appear as the specification proceeds, in view, my invention consists of the construction and arrangement all as hereinafter more particularly described and illustrated with reference to the accompanying drawing, in which the single figure is a view of a supercharger embodying my invention showing the casing and the drive mechanism in section and the impellers in elevation.

Rotary compressors of the orthodox variety may be divided into two types. In the first type, an impeller with radial blades is rotated on a shaft and air picked up by the blades in the neighborhood of the shaft is flung radially of the shaft along the blades, the velocity of the individual particles increasing with the distance of the air particle from the shaft. Such a compressor, while operating with air at an intake pressure or capacity for which it has been designed may give a very high compression ratio but, the geometry of the impeller being fixed, the spacing between radial blades increases rapidly with the distance from the axis. This causes turbulence and therefore lowering of the efficiency. Since efficiency has an influence on the compression ratio, the latter is not as high as the theoretical maximum.

The second type of centrifugal compressor makes use of an impeller having blades on its periphery which fling the air particles in a direction parallel to the axis of the impeller, and here since turbulence between the blades does not appear, the aerodynamic efficiency is higher than that of radial compressor, but the geometry of the impeller limits the compression ratio obtainable in a single stage compressor to a very narrow range of air densities, which is even narrower than that for the radial type, in as much as the blades on the periphery of the impeller are substantially parallel and the diameters on both sides of the impeller are the same. This prevents the application of the speed ratio on the inlet and the outlet, necessary to obtain sufficiently high value of compression ratio.

According to my invention I provide two rings of the impeller of the axial type, running with different speeds, in the same or opposite sense, and means for varying the speeds of the two rings of the impeller in accordance with the compression ratio to be obtained.

Referring to the drawing, such a device may consist of a housing 10 provided with an inner shell 11 which define between them an air passage of annular form terminating in a bell mouth 12 of streamline section. The shell 11 is closed by a shell 13 having an integral flange 14, the two defining an annular space, registering with the above-mentioned annular passage, provided with a bell mouth 15 of streamline form. Mounted in the housing 10 is a pair of impellers 16 and 17 provided with blades 18 and 19, respectively, which travel in the annular space. As illustrated, the impellers rotate in the same direction, but if desirable, they may be rotated in opposite directions. The orientation of one set of blades would be reversed if the impellers illustrated were intended to rotate in opposite directions. Apparatus is provided for controlling the supply of air to the inlet 15. This apparatus includes a plurality of spin vanes or intake blades 20 (of which only two are illustrated) pivoted, as at 21, in the annular passage and swingable in unison by a crank 22 on each ganged to a control ring (not shown). These spin vanes 20 can be angularly adjusted to control the volume of air drawn into the compression chamber. Conventional fixed diffuser blades 23 are provided at the outlet end 12 of the annular space to maintain streamline flow at the outlet.

In the preferred embodiment of my device shown, the impeller 16 and 17 are rotated individually by means of a drive shaft 24 journalled in a gear case 25 mounted on the shell 11. Impeller 16 is provided with a shaft 26 journalled at one end in the shell 13 and at the other end in a hollow portion of the shaft 24. Impeller 17 is provided with a sleeve 27 running freely on the shaft 26. The shaft 26 carries a gear 28, the sleeve 27 carries a gear 29, and a disc 30 is mounted on the shaft 26 for free rotation thereon between the gears 28 and 29. A shaft 31 is rigidly secured in the disc 30 and a double gear 32 and a second double gear 33 are mounted on such shaft for free rotation thereon. A gear 34 integral with the shaft 24 meshes with the small end of the double gear 32 and the large end of the gear 32 meshes with the gear 28 on the shaft 26; the large end of the double gear 33 meshes with the gear 29 on the sleeve 27 and the small end of the gear 33 meshes with a motionless gear 35 integral with the shell 11.

The operation of my compressor is as follows. When the shaft 24 is driven, as it might be in practice by a gear connection to an aircraft engine, the gear 34 drives the shaft 26 through the medium of the double gear 32 and the gear 28, and the interaction of the gear 32 with the gears 34 and 28 causes the disc 30 to rotate, causing the gear 33, by virtue of its engagement with the ring gear 35, to travel around the ring gear and simultaneously drive the sleeve 27 through the gear 29. It will thus be evident that resistance to rotation of the two impellers must be the same. For aero-dynamical reasons the impeller 17 may be driven at a speed approximately double that of impeller 16, when the two impellers rotate in the same sense. This is obtained by an appropriate choice of the shape of blades 18, 19 and the position of the intake blades 20. If the resistance to rotation offered by impeller 16 increases because of the change of position of adjustable intake blades 20, its speed will decrease while the speed of impeller 17 will increase and vice versa, because the differential set of gears needs a state of perpetual statical and dynamical equilibrium. The characteristics of the differential gear train are such that at constant speed of the shaft 24, the sum of the speeds of the two impellers is constant in the device as illustrated; this is one relationship of the many possible so long as the relationship meets the requirement that the speed of one impeller be a linear function of the speed of the other.

The result of this arrangement is that, as the impellers 16 and 17 rotate, fluid is drawn in through the inlet 15 through the annular passage, where it is compressed and discharged at a higher pressure through the outlet 12. If the density of the fluid entering the inlet 15 varies, the air pressure at the outlet being necessarily constant, the resistance offered by the fluid to compression by the blades 18 will vary and the speed of the impeller 16 will correspondingly increase, or decrease, in relation to the speed of the impeller 17. Since the angular setting of the intake blades 20, are adjustable, the relative speeds of the impellers 16 and 17 will automatically adjust themselves to the ratio giving optimum efficiency of the compressor.

It may be pointed out that in practice it may be desirable to have the setting of the intake blades 20 controlled automatically, by some device such as a servo control, in accordance with the output pressure of the compressor, such as is commonly the case when the output of the supercharger is fed to an internal combustion engine. Further, while the differential drive between the two impellers is a preferred embodiment of my invention, it may be desirable on occasion to use a simpler gear train in which the speed ratio of the two impellers is constant, the speed of the impeller 17, always, of course, being different from that of impeller 16.

While I have disclosed a preferred embodiment of my invention, it is to be understood that such disclosure is solely for purposes of illustration and description, and is intended to impose no limitation on the scope of the invention beyond those set forth in the appended claims.

What I claim as my invention is:

1. In a supercharger adapted to operate at substantially constant efficiency over a range of air densities, a casing defining an annular compression chamber with an inlet and an outlet, a pair of vaned impellers and separate supports on which said impellers are mounted for individual rotation in the casing about an axis and with the impellers spaced apart along said axis, the blades of each impeller extending in a direction having a component generally parallel with said axis and traveling in said compression chamber on rotation of the impellers, a common driving element and differential gearing connecting said driving element with the respective impellers the individual connections of the differential gearing between said common driving element and the respective impellers having different gear ratios so that the differential gearing drives the impellers with different torques but with a substantially constant torque ratio, to one another, spin vanes located at the inlet of the casing, and means for angularly adjusting said vanes to control the speed ratio of the two impellers with respect to one another.

2. A supercharger comprising a housing, a shell connected to the front of the housing and having an annular inlet opening for the entrance of air into an annular compression chamber through which the air flows to an outlet opening from the housing, spin vanes angularly spaced around the circumferential extent of the inlet opening, pivots for the spin vanes supported from said shell, apparatus for changing the angular positions of the spin vanes to change the spin of the air that flows into the compression chamber through said inlet opening, a first impeller for drawing air into the compression chamber, said impeller comprising a multi-bladed rotor with a ring of substantial diameter and blades angularly spaced around and supported from the peripheral portion of the ring, the radial extent of each of said blades being substantially less than one-half of the radius of the impeller, a second impeller between the first impeller and the compression chamber outlet and also comprising a multi-blade rotor with blades angularly spaced around and supported from a peripherial portion of a ring of substantial diameter, and with the radial length of the impeller blades less than one-half of the radius of said second impeller, bearings supporting the respective impellers with their blades in close proximity to one another within the compression chamber and for rotation at different speeds, differential gearing located outside of the annular compression chamber and including a common driving element with separate gearing connecting the opposite sides of the differential gearing with the respective impellers for driving the impellers with a speed ratio to one another that is affected by the angular adjustment of the spin vanes at the supercharger inlet opening.

3. A supercharger comprising a casing having an annular inlet passage, a first impeller with vanes around its periphery and adjacent the annular inlet for advancing air through said inlet and into a compression chamber in which the impeller rotates within the housing, a second impeller of the same size as the first impeller and located in the compression chamber in axial alignment with the first impeller and spaced from the first impeller by a distance less than the axial width of the impellers and with unobstructed air flow from the first to the second impeller, an annular outlet passage just beyond the second impeller, a drive shaft connected with the first impeller and extending rearwardly through the center of the second impeller, a drive sleeve connected with the second impeller and surrounding the drive shaft of the first impeller for a portion of the length of the drive shaft, planetary differential gearing connecting the drive shaft and the drive sleeve with a common driving element and with the connection of the differential gearing between said common driving element and the sleeve having a different gear ratio from that of the connection between said common driving element and the shaft so that the differential impellers are each driven with a different torque, spin vanes supported on pivot at angularly spaced regions around the annular inlet, and cranks connected with the respective spin vanes for changing the angular setting of the spin vanes to change the spin of the air and the relative speeds of the impellers.

BOLESLAW SZCZENIOWSKI.

REFERENCES CITED

The following references are of record in the file of this patent:

UNITED STATES PATENTS

| Number | Name | Date |
|---|---|---|
| Re. 20,668 | Seelig | Mar. 8, 1938 |
| 847,735 | Cruikshank | Mar. 19, 1907 |
| 1,402,059 | Eich | Jan. 3, 1922 |
| 1,461,422 | Jolly et al. | July 10, 1923 |
| 1,615,619 | Finne | Jan. 25, 1927 |
| 1,698,287 | Westgard | Jan. 8, 1929 |
| 1,998,778 | Gregg | Apr. 23, 1935 |
| 2,346,032 | Kinnucan | Apr. 4, 1944 |
| 1,316,139 | Cake | Sept. 16, 1919 |
| 1,989,337 | Roe | Jan. 29, 1935 |
| 2,121,073 | De Bothezat | June 21, 1938 |
| 2,159,278 | Lesley | May 23, 1939 |
| 2,361,887 | Traupel | Oct. 31, 1944 |
| 2,371,706 | Planoil | Mar. 20, 1945 |